Figure 1:
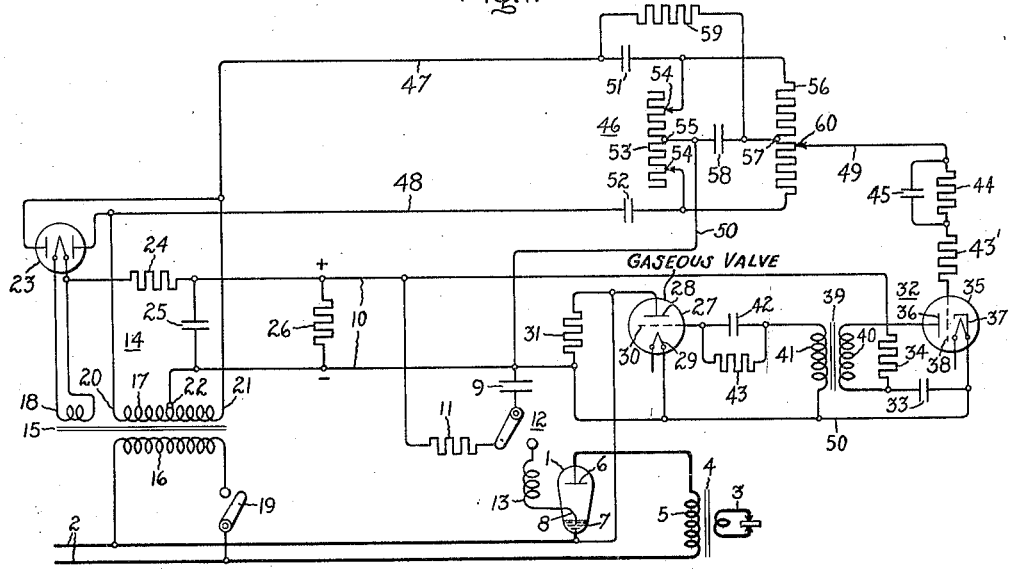

Dec. 29, 1942.   W. W. MOE   2,306,791
ELECTRIC VALVE CIRCUIT
Filed July 30, 1938

Inventor:
William W. Moe,
by Harry E. Dunham
His Attorney.

Patented Dec. 29, 1942

2,306,791

UNITED STATES PATENT OFFICE 2,306,791

ELECTRIC VALVE CIRCUIT

William W. Moe, Bridgeport, Conn., assignor to General Electric Company, a corporation of New York Application July 30, 1938, Serial No. 222,255

9 Claims. (Cl. 250—27)

My invention relates to electric valve circuits and more particularly to electric valve circuits for effecting a single energization of a load circuit.

Electric valve circuits have been applied to arrangements for effecting energization of a load circuit from an alternating current supply circuit during a predetermined interval of time. The characteristics of electric valve apparatus make possible their use in circuits of this nature. For example, in electric welding operations, electric valve apparatus have been utilized because of the facility with which current may be initiated and interrupted. For instance, in spot welding operations electric valve apparatus may be employed to effect the transfer of a predetermined amount of energy to a load circuit during an accurately determinable interval of time. Various control arrangements have been applied to electric valve apparatus for effecting this type of control. In accordance with the teachings of my invention described hereinafter, I provide a new and improved control circuit whereby a predetermined amount of energy may be transmitted to a load circuit from an alternating current circuit.

It is an object of my invention to provide a new and improved electric valve circuit.

It is another object of my invention to provide a new and improved control system for electric valve translating apparatus.

It is a further object of my invention to provide a new and improved electric valve control system for electric valve translating apparatus.

It is a still further object of my invention to provide a new and improved phase shifting circuit for controlling electric valves.

In accordance with the illustrated embodiment of my invention, I provide a new and improved control circuit for an electric valve means which is interposed between an alternating current supply circuit and a load circuit, such as a welding circuit. The electric valve means comprises a control member which initiates an arc discharge within the electric valve means and effects transfer of energy to the welding circuit. The control circuit comprises a capacitance which is charged from a source of direct current through a charging circuit. The discharge circuit for the capacitance includes the control member of the electric valve means and an electronic discharge device of the type employing an ionizable medium. A switching means is provided to connect selectively the capacitance to the source of direct current or to the control member to effect a single energization of the control member. The time during the cycle of voltage of the alternating current circuit at which the control member is energized is controlled by the electronic discharge device. This electronic discharge device is provided with a control member on which there is impressed a periodic voltage of peaked wave form. The periodic voltage of peaked wave form is generated by a second circuit which comprises a capacitance and a discharge device of the high vacuum type or of the vapor or gaseous type which periodically discharges the second capacitance to generate the periodic voltage. The electron discharge device is provided with a grid; and the grid is energized from the alternating current circuit through a phase shifting circuit which controls the phase of the voltage impressed on the control member. The voltage of the control member may be varied in phase in a continuous manner throughout a region extending through the leading quadrant and the lagging quadrants relative to the voltage of the alternating current supply circuit. There is provided a new and improved phase shifting circuit of the static impedance type whereby an output voltage of the phase shifting circuit may be varied in phase in a continuous manner throughout a region extending through the leading quadrant and the lagging quadrants relative to the voltage of the associated supply circuit.

Figure 2:
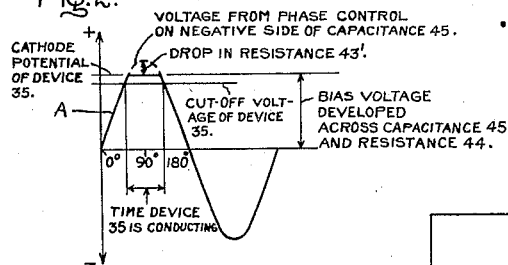
Figure 5:
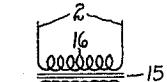
Figure 3:
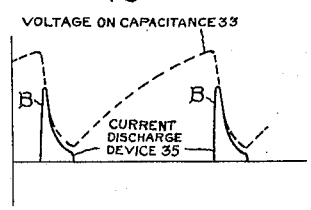
Figure 4:
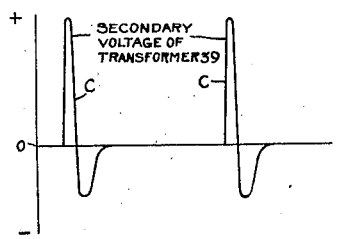

For a better understanding of my invention, reference may be had to the following description taken in connection with the accompanying drawing, and its scope will be pointed out in the appended claims. Fig. 1 of the accompanying drawing diagrammatically illustrates an embodiment of my invention as applied to a welding system, and Figs. 2, 3 and 4 represent certain operating characteristics thereof. Fig. 5 represents certain operating characteristics of the phase shifting circuit shown in Fig. 1.

Referring now to Fig. 1 of the accompanying drawing, my invention is diagrammatically illustrated as applied to a resistance welding circuit. An electric valve means 1 is interposed between an alternating current supply circuit 2 and a load circuit, such as a welding circuit 3. A transformer 4 is connected between the circuits, and the electric valve means 1 may be connected in series relation with a primary winding 5 of the transformer 4. The electric valve means 1 is preferably of the type employing an ionizable medium, such as a gas or a vapor, and comprises an anode 6, a cathode of the self-reconstructing type, such as a mercury pool cathode 7, and an associated control member 8 of the immersion-ignitor type having an extremity thereof extending below the surface of the mercury pool cathode 7. The immersion-ignitor control member 8 is preferably constructed of a material having a relatively high specific electrical resistivity relative to that of the associated cathode 7. For example, the immersion-ignitor control member 8 may be constructed of a material such as boron-carbide or silicon-carbide. An arc discharge is initiated between the anode 6 and the cathode 7 when a sufficiently large current is transmitted through the immersion-ignitor control member 8.

A capacitance 9 is connected to be charged from a suitable source of direct current 10 through a charging circuit comprising a resistance 11. A suitable circuit controlling means, such as a switching means or switch 12, is arranged to selectively connect the condenser 9 to the charging circuit or to the immersion-ignitor control member 8. An inductance 13 may be connected in series relation with the control member 8 to control the rate of discharge of the capacitance 9.

The source of direct current 10 may be provided by any suitable arrangement and I have chosen to represent it as being supplied by a circuit 14 comprising a transformer 15 having a primary winding 16 and secondary windings 17 and 18. A switch 19 may be interposed between the alternating current supply circuit 2 and the primary winding 16. Secondary winding 17 is provided with a pair of terminal connections 20 and 21 and a connection 22 electrically intermediate the terminal connections. A suitable rectifying device, such as a double-anode electric valve 23, is associated with secondary winding 17 and serves as a full wave rectifier. The output voltage of the electric valve 23 is impressed upon a filter circuit including a resistance 24 and a capacitance 25. The output circuit of the rectifier also includes a resistance 26 across the terminals of which appears a unidirectional voltage of the polarity indicated.

To effect energization of the immersion-ignitor control member 8 at a predetermined time during the cycle of voltage of circuit 2, I provide a discharge circuit for the capacitance 9 including an electronic discharge device 27 which is preferably of the type employing an ionizable medium. The electronic discharge device 27 includes an anode 28, a cathode 29 and a control member 30. The discharge device 27 is included in the discharge circuit for the capacitance 9 and is connected across a suitable impedance element such as a resistance 31. Of course, the discharge circuit is closed when the switch 12 is moved to the right-hand position.

In order to render the electronic discharge device 27 conductive at a predetermined time during the cycles of voltage of the alternating current circuit 2, I provide a circuit 32 including a capacitance 33 which is charged from the direct current circuit 10 through a resistance 34. The circuit 32 also includes an electronic discharge device 35, which is preferably of the high vacuum type having an anode 36, a cathode 37 and a grid 38. The capacitance 33 is discharged through the electronic discharge device 35 and through a primary winding 40 of transformer 39. A periodic voltage of peaked wave form is induced in the secondary winding 41 of transformer 39 and is impressed on the control member 30 of electronic discharge device 27. To produce a suitable negative unidirectional biasing potential, I provide any conventional arrangement, preferably a parallel connected capacitance 42 and a resistance 43. These elements comprise the well known self-biasing type of circuit which produces a negative unidirectional biasing potential.

A current limiting resistance 43' may be connected in series relation with grid 38 of electronic discharge device 35 and a self-biasing type of circuit comprising a parallel connected resistance 44 and a capacitance 45 may be connected in series relation with the resistance 43' to produce a negative unidirectional biasing potential. The resistance 44 and the capacitance 45 and the resistance 43' may be proportioned so that the electronic discharge device 35 is rendered conductive during only a relatively short interval of time during each positive half cycle of voltage of the alternating current circuit 2, as, for example, during an interval of about sixty electrical degrees near the peak value of the voltage of circuit 2.

I provide a phase shifting circuit 46 which may be energized from the alternating current circuit 2, or may be energized from any suitable source of alternating current correlated in phase and frequency with respect to the voltage of circuit 2. The phase shifting circuit is being claimed in my copending divisional application Serial No. 270,889 which is assigned to the assignee of the present application. The phase shifting circuit 46 comprises a winding, such as a winding 17, of transformer 15 having terminal connections 20 and 21 and an electrically intermediate connection 22. The connections 21 and 22 of winding 17 are connected to the phase shifting circuit through conductors 47 and 48, respectively; and the output circuit of the phase shifting circuit 46 comprises conductors 49 and 50.

A pair of reactive elements, such as a pair of capacitances 51 and 52; and a resistance 53 are connected across the terminal connections 20 and 21 of winding 17, and the resistance 53 is connected between the capacitances 51 and 52. The resistance 53 is provided with a pair of adjustable terminal connections 54 and an electrically intermediate connection 55. A voltage divider comprising a second resistance 56 is connected across the terminals of resistance 53 and includes an intermediate connection 57. Capacitance 58 is connected between the intermediate connection of resistances 53 and 56; and a suitable impedance element, such as a resistance 59, is connected between a terminal of winding 17, and terminal 20, and intermediate connection 57 of resistance 56. The resistance 56 is provided with a suitable connection 60 which controls or permits adjustment of the phase of the voltage of the output circuit, comprising conductors 49 and 50, relative to the voltage of circuit 2. By adjusting the position of the contact 60 across the resistance 56, the phase of the voltage applied to grid 30 of valve 27 may be varied in a continuous manner throughout the leading quadrant and the lagging quadrants of the voltage of circuit 2.

The operation of the embodiment of my invention diagrammatically illustrated in Fig. 1 will be explained by considering the system when it is operating to transmit a single impulse of current to the welding circuit 3 from the alternating current supply circuit 2. The switch 19, of course, is maintained in the closed circuit position and initially the switch 12 is placed in the left-hand position to charge the capacitance 9 from the direct current circuit 10. To initiate operation of the system to transmit the single energization of the welding circuit 3 in response to a controlling operation of the switch 12, the switch 12 is moved to the right-hand position connecting the capacitance 9 in circuit with the immersion-ignitor control member 8 of the electric valve means 1. The electronic discharge device 27, by virtue of the periodic voltage which is impressed on its control member 30, will not initiate discharge of the capacitance 9 until the occurrence of a predetermined time during the cycle of voltage of circuit 2. At that time the electronic discharge device 27 is rendered conductive by the periodic voltage produced by the circuit 32 and the capacitance 9 is discharged through a circuit including inductance 13, immersion-ignitor control member 8, cathode 7, electronic discharge device 27 and capacitance 9. This circuit constitutes a discharge circuit for the capacitance 9 and so long as the switch 12 is maintained in the right-hand position, the capacitance 9, of course, cannot be recharged. Furthermore, the time constant of the discharge circuit is such that the period of energization of the immersion-ignitor control member 8 is substantially less than a half cycle of voltage of circuit 2. The discharge current of capacitance 9, of course, is sufficient to establish a cathode spot on the cathode 7, thereby rendering the electric valve means 1 conductive and the electric valve means 1 conducts current for a half cycle of voltage of circuit 2 or for a portion of a half cycle of voltage, depending upon the time during the cycle at which the immersion-ignitor control member 8 is energized. Of course, it is to be understood that the current which flows through the electric valve means 1 is maintained for a period of time after the line voltage passes through zero, by virtue of the inductance of the associated circuit. The duration of such period or extension in the time of conduction depends upon the power factor of the load circuit.

It is well understood by those skilled in the art that the average current transmitted by the electric valve means 1 and hence the amount of energy transmitted to the welding circuit 3 depends upon the time during the applied positive half cycle of anode-cathode voltage at which the electric valve is rendered conductive. The energy transmitted to the welding circuit 3 is increased as the time of initiation of the discharge is advanced towards the beginning of the positive half cycle and is, of course, decreased as the time of initiation of the discharge is retarded.

The manner in which the circuit 32 produces a periodic voltage of peaked wave form, which is impressed upon the control member 30 of the electronic discharge device 27, may be explained by considering the operating characteristics shown in Figs. 2-4. The capacitance 33 is charged from the direct current circuit 10 and is discharged at a predetermined time by the electronic discharge device 35. Curve A of Fig. 2 represents the alternating voltage impressed on grid 38 of discharge device 35 by the phase shifting circuit 46. Since in this unit the discharge device 35 is of the high vacuum type, the grid voltage is effective to interrupt as well as initiate the current transmitted by the discharge device. Resistance 44 and capacitance 45 and resistor 43' are proportioned to develop a negative biasing potential of a magnitude such that the electronic discharge device 35 conducts current during only a relatively small portion of a cycle as, for example, a sixty electrical degree interval occurring at about the peak of the voltage wave. Curves B of Fig. 3 represent the current transmitted to the primary winding 40 of transformer 39, and curves C of Fig. 4 represent the periodic voltage of peaked wave form induced in the secondary winding 41 of transformer 39. It will be observed that the peak of the voltage of peaked wave form, as represented by curves C, is about thirty electrical degrees ahead of the peak of the output voltage of the phase shifting circuit 46. To afford complete control of the energy transmitted to the welding circuit 3, or, in other words, to afford complete control of the heat transmitted to the weld, the phase shifting network 46 should be able to supply a voltage the phase of which can be varied in a continuous manner from sixty electrical degrees leading the power voltage of circuit 2 to one hundred twenty electrical degrees lagging that voltage. Furthermore, for proper operation of the electronic discharge device 35, the output voltage of the phase shifting circuit 46 should also supply a reasonably constant voltage over its operating range.

The operation of the phase shifting circuit or network 46 may be more fully explained by considering the diagram of Fig. 5. In this figure the various elements of the phase shifting circuit 46 are drawn in their approximate voltage vector positions in order to facilitate explanation of the operation of the circuit. Vector OD represents the voltage appearing between intermediate connection 22 and terminal 21 of winding 17 of transformer 15 and, of course, represents the anode-cathode voltage of the electric valve means 1. For the transmission of maximum current to the welding circuit 3, or, in other words, for the transmission of maximum welding heat to the work, it is required that a voltage leading the voltage of circuit 2 by sixty electrical degrees by impressed on the grid 38 of the electronic discharge device 35. This voltage is obtained by adjusting the position of the contact 60 along the resistance 56, as indicated by the dotted lines of Fig. 5. As the contact 60 is moved upward, the voltage impressed on the grid 38 is advanced in phase with respect to the voltage of circuit 2, and when it reaches the uppermost position the angle of advance is maximum. Conversely, as the adjustable contact 60 is moved downward the output voltage of the phase shifting circuit and hence the voltage impressed on grid 38 are retarded with respect to the voltage of circuit 2. Of course, there is a position for the contact 60 at which the potential impressed on the grid 38 is in phase with the voltage of circuit 2. I have found that the magnitude of the voltage impressed on the grid 38 is constant within a range of approximately plus or minus 15% over its operating range. Continuous phase adjustment of the voltage impressed on grid 38 may be obtained by positioning the adjustable contact 60. The variation in the output voltage of the phase shifting circuit 46 has a negligible effect on the operation of the electronic discharge device 35 and hence has a negligible effect on the peaked voltage produced by the circuit 32.

After an impulse of current is transmitted to the welding circuit 3 by moving the switch 12 to the right-hand position, the circuit may be reset by moving the switch 12 to the left-hand position where capacitance 9 is recharged through the circuit comprising resistance 11. The system is then in condition for another welding operation.

An important feature of this type of control is the uniformity of the welding current which is transmitted to the circuit 3. By virtue of the fact that the welding operation is initiated at a predetermined time during each cycle of voltage of circuit 2, the variation in the welding current is reduced to a minimum since the starting transients may be entirely eliminated, or substantially reduced, by controlling the time of initiation of the current relative to the power factor angle of the load circuit. Another important feature is the uniformity of control of the magnitude of the periodic voltage of peaked wave form produced by the circuit 32 and which is substantially independent of variations in the magnitude of the variable phase output voltage of the phase shifting circuit 46.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a load circuit, electric translating apparatus connected between said circuits and comprising an electric valve means having a control member, a capacitance, charging means for said capacitance, a discharge circuit for said capacitance and comprising said control member and an electronic discharge device, means for selectively connecting said capacitance to said charging means or to said discharge circuit to place said translating apparatus in condition to effect energization of said load circuit by connecting said discharge device in circuit with said control member and said capacitance to transmit a single impulse of current to said control member, said electronic discharge device having a control member for controlling the conductivity thereof, and means for energizing the control member of the electronic discharge device to render said discharge device conductive at a predetermined time during a cycle of voltage of said alternating current circuit.

2. In combination, an alternating current circuit, a load circuit, electric valve means connected between said circuits for transmitting energy therebetween and having a control member for controlling the conductivity thereof, a capacitance, charging means for said capacitance, an electronic discharge device connected in series relation with said capacitance and said control member for energizing said control member to render said electric valve means conductive by discharging said capacitance through said control member, said electronic discharge device having a control member for controlling the conductivity thereof, a circuit for impressing a periodic voltage on the control member of said electronic discharge device and comprising a second capacitance which is energized from said charging means and a second electronic discharge device for discharging said second capacitance, and means for connecting the first capacitance in circuit with the control member of the said electric valve means to effect a single energization of the control member.

3. In combination, an alternating current circuit, a load circuit, electric valve means connected between said circuits for transmitting energy therebetween and having a control member for controlling the conductivity thereof, a capacitance, charging means for said capacitance, an electronic discharge device connected in series relation with said capacitance and said control member for energizing said control member to render said electric valve means conductive by discharging said capacitance through said control member, said electronic discharge device having a control member for controlling the conductivity thereof, a circuit for impressing a periodic voltage on the control member of said discharged device and comprising a second capacitance which is energized from said charging means and a second electronic discharge device for discharging said second capacitance, and means for selectively connecting said first mentioned capacitance to said charging means or to the control member of said electric valve means.

4. In combination, an alternating current circuit, a load circuit, electric valve means connected between said circuits for transmitting energy therebetween and having a control member for controlling the conductivity thereof, a capacitance, charging means for said capacitance, an electronic discharge device connected in series relation with said capacitance and said control member for energizing said control member to render said electric valve means conductive by discharging said capacitance through said control member, said electronic discharge device having a control member for controlling the conductivity thereof, a circuit for impressing a periodic voltage on the control member of said electronic discharge device and comprising a second capacitance which is energized from said charging means and a second electronic discharge device for discharging said second capacitance, and switching means connected between said first mentioned capacitance and the control member of said electric valve means.

5. In combination, an alternating current circuit, a load circuit, electric valve means connected between said circuits for transmitting energy therebetween and having a control member for controlling the conductivity thereof, a capacitance, charging means for said capacitance, an electronic discharge device connected in series relation with said capacitance and said control member for energizing said control member to render said electric valve means conductive by discharging said capacitance through said control member, said electronic discharge device having a control member for controlling the conductivity thereof, an electric circuit for impressing a periodic voltage on the control member of said electronic discharge device and comprising a second capacitance, said second capacitance being charged from said charging means and means including a second electronic discharge device for discharging said second capacitance, said second discharge device having a control member, and a phase shifting circuit for energizing said last mentioned control member to control the conductivity of said second discharge device.

6. In combination, an alternating current circuit, a load circuit, electric valve means connected between said circuits for transmitting energy therebetween and having a control member for controlling the conductivity thereof, a capacitance, charging means for said capacitance, an electronic discharge device connected in series relation with said capacitance and said control member for energizing said control member to render said electric valve means conductive by discharging said capacitance through said control member, said electronic discharge device having a control member for controlling the conductivity thereof, a circuit for impressing on the control member of said electronic discharge device a periodic voltage comprising a second capacitance which is energized from said charging means and a second electronic discharge device of the high vacuum type for discharging said second capacitance, the second electronic discharge means being provided with a grid, means interposed between said alternating current circuit and said grid for impressing on said grid a periodic voltage variable in phase with respect to the voltage of said alternating current circuit, and means for connecting the first capacitance in circuit with the control member of said electric valve means to effect a single energization of said control member.

7. In combination, an alternating current circuit, a load circuit, electric valve means connected between said circuits for transmitting energy therebetween and having a control member for controlling the conductivity thereof, a capacitance, means for charging said capacitance, an electronic discharge device connected in series relation with said capacitance and said control member for energizing said control member to render said electric valve means conductive by discharging said capacitance through said control member, said electronic discharge device being of the type employing an ionizable medium and having a control member, a circuit for impressing on the control member of said electronic discharge device a periodic voltage of peaked wave form variable in phase with respect to the voltage of said alternating current circuit and comprising a second capacitance which is energized from said charging means, an electronic discharge device of the high vacuum type for discharging the second capacitance and means for controlling the conductivity of the last mentioned electronic discharge device, and means for connecting the first capacitance in circuit with the control member of said electric valve means to effect a single energization of the control member, said electric valve means being rendered conductive at a time during the cycle of the voltage of said alternating current circuit established by said electronic discharge device of the high vacuum type.

8. In combination, an electric valve means having an anode, a cathode and a control member, a source of direct current, a capacitance, a charging circuit for charging said capacitance from said source, a discharge circuit for said capacitance and comprising said control member and an electronic discharge device of the gaseous type, said electronic discharge device having a control member, a circuit comprising a second capacitance connected to be charged from said source and an electric valve connected in circuit with said second capacitance and the control member of said electronic discharge device for periodically discharging said second capacitance to impress a periodic voltage on the control member of said electronic discharge device, and means for selectively connecting the first mentioned capacitance to said charging circuit or to said discharge circuit to effect a single energization of said control member.

9. In combination, an alternating current circuit, a load circuit, an electric valve means interposed between said circuits for controlling the transfer of energy therebetween and comprising an anode, a cathode and a control member, a source of direct current, a capacitance, a charging circuit for said capacitance, a discharge circuit for said capacitance comprising said control member and an electronic discharge device, means for connecting said electronic discharge device in circuit with said capacitance and said control member, said electronic discharge device having a control member for initiating discharge of said capacitance, means for selectively connecting said capacitance to said charging circuit or to said discharge circuit to effect a single energization of said first mentioned control member, a circuit for impressing on the control member of said electronic discharge device a periodic voltage of peaked wave form comprising a second capacitance connected to be charged from said source and an electronic discharge device of the high vacuum type having a grid, and a phase shifting circuit energized from said alternating current circuit for impressing on said grid a periodic voltage variable in phase with respect to the voltage of said alternating current circuit.

WILLIAM W. MOE.